April 20, 1954 A. H. MIDGLEY 2,676,281
SYNCHRONOUS MOTOR
Filed Nov. 19, 1951
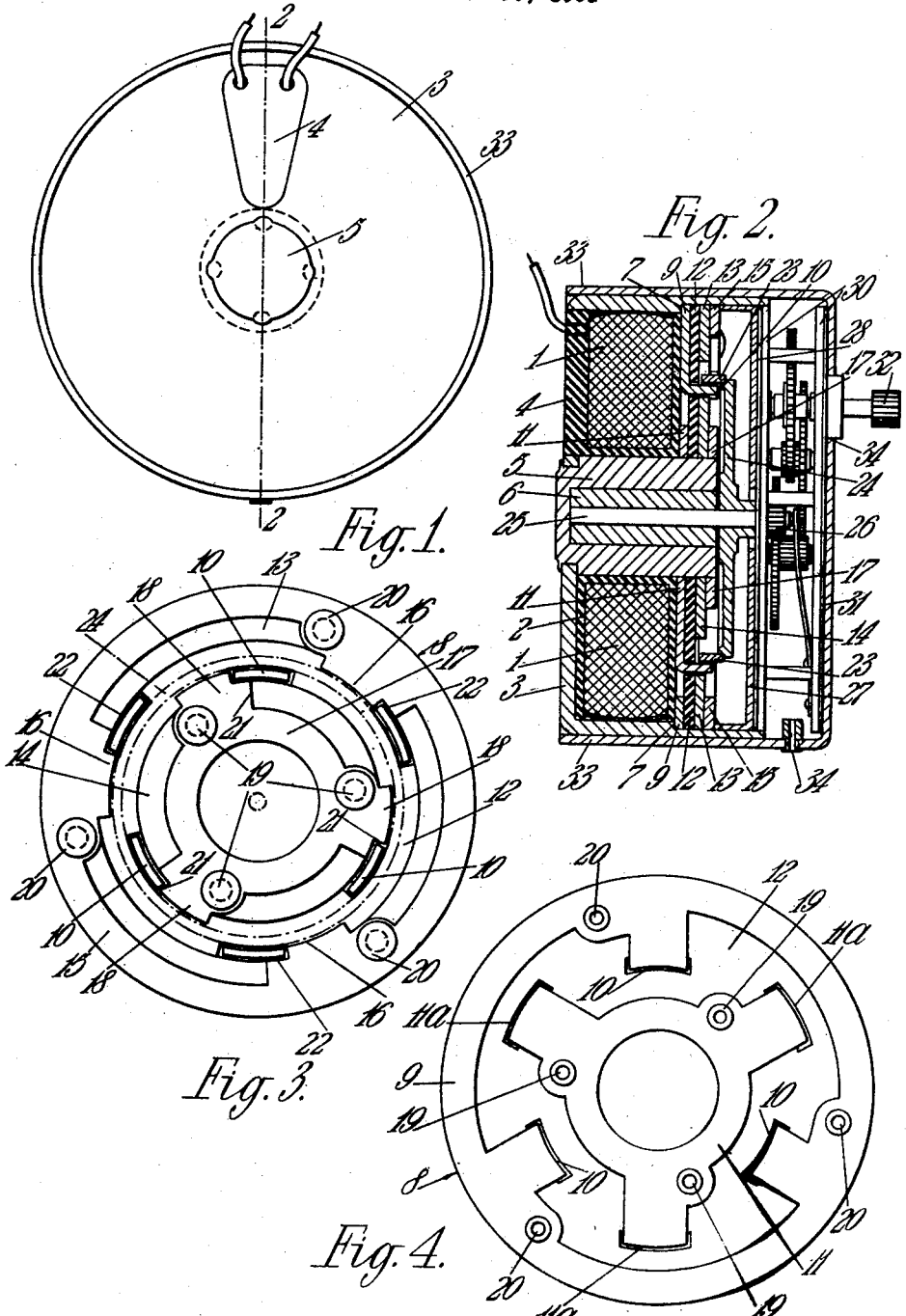
Inventor
A. H. Midgley Patented Apr. 20, 1954

2,676,281

UNITED STATES PATENT OFFICE 2,676,281

SYNCHRONOUS MOTOR

Albert Henry Midgley, Northwood, England

Application November 19, 1951, Serial No. 256,984

Claims priority, application Great Britain
November 24, 1950

6 Claims. (Cl. 310—164)

This invention relates to self-starting synchronous motors such as those used in clocks, timing devices, meters and the like.

An object of this invention is to provide an improved form of such a motor having a higher torque than comparable previous arrangements and being of compact construction and small overall dimensions.

The invention has special application in connection with self-starting synchronous motors having both shaded and unshaded poles, more especially of the type in which the stator parts of a motor, namely, coil, pole assembly and gear train are formed as separate unitary structures for assembly by axial superposition in an arrangement whereby they are suitably locked against rotation.

According to the invention, a set of spaced co-operating pole-pieces of the stator are located respectively on the inside and outside of a cylindrical shell rotor.

Conveniently pole-pieces of the stator of like polarity are provided both inside and outside of the annular space.

Further, according to the invention, a set of pole-pieces of the stator are formed in the plane of a flat plate and are thus coplanar.

One flat plate in which the pole-pieces are cut may form an outer set of pole-pieces and a second flat plate from which pole-pieces are cut an inner set of pole-pieces, the plates being arranged to be coplanar.

Further, according to the invention, a second set of co-operating pole-pieces are formed from inner and outer coplanar flat rings, the ends of the pole-pieces being turned over in the same direction, and the turned-over ends of the pole-pieces brought to be adjacent the flat plate pole-pieces.

Conveniently, the turned-over ends of the pole-pieces are passed through circumferential slots in a flat insulating ring to which the flat pole-piece rings are secured.

Thus the turned-over pole-piece ends form an inner and outer ring with a space for the rotor in between.

Conveniently, the outer ring pole-pieces can be inside the rotor and the inner ring pole-pieces outside the rotor.

Conveniently, the flat pole-pieces and the turned-over co-operating pole-pieces are spaced apart by a copper ring and are secured together by rivets passing through the pole-piece sets, the copper ring and the insulating ring.

The pole-pieces of the flat plates may be cut away at the leading end and the adjacent turned-over pole-pieces set in the recess or rebate formed to ensure close co-operation and low reluctance between these pole-pieces.

The pole-pieces of flat plates will be spaced by an appreciable distance circumferentially and radially from the turned-over pole-pieces adjacent the trailing edge to ensure a high reluctance therebetween.

Instead of one copper ring two flat coplanar copper rings are preferred, one radially inside the other and the other radially outside the cylindrical shell of the rotor.

An embodiment of the invention is shown in the accompanying drawings.

Figure 1 is an end view of the embodiment showing the electrical connections,

Figure 2 is an axial section on the line 2—2 of Figure 1,

Figure 3 is a front, and

Figure 4 a reverse view of the unitary pole-piece structure.

A coil 1 wound on an insulator former 2 is a close fit at the bottom of a cylindrical cup 3 of magnetic material. A radially disposed wedge-shaped projection 4 on the side of the former projects through a correspondingly shaped slot in the base of the cup to lock the former against rotation, and the ends of the coil are brought out through two circumferentially spaced holes in the projection.

On the inside, the cup is formed with an axially disposed cylindrical projection 5 of magnetic material around which the former is a close fit, the cylindrical projection, however, extending beyond the former.

The cylindrical projection is passed through the bottom of the cup and secured by knocking over its edge at circumferentially spaced points.

The cylindrical projection has an axial aperture surrounded by a self-lubricating bushing 6.

At the level of the outer flat circular surface of the former within the cup, the cup is formed on the inside with a circumferential shoulder 7 and on this shoulder rests the pole structure 8 of the stator, fitting over the projecting portion of the cylindrical projection of the magnetic material.

The pole structure 8 is a removable unit formed in four axially spaced layers. The layer adjacent the former comprises an outer flat ring 9 of magnetic material with three radially inwardly directed projecting pole-pieces 10 turned over at the ends, away from the former, into the axial direction and a coplanar inner flat ring 11 of magnetic material with three radially outwardly projecting pole-pieces 11a turned over at the ends, away from the former, into the axial direction. The inner ring is a close fit over the cylindrical projection 5 of the cup 3.

The turned-over ends of the inner flat ring form an outer ring of turned-over pole-piece ends; and the turned-over ends of the outer ring form an inner ring of turned-over pole-piece ends.

Fitting over the turned-over ends of the pole-pieces is a flat insulating ring 12 slotted to allow passage of these turned-over ends.

Fitting over the insulating ring there is a flat outer ring 13 of copper and a flat inner ring of copper 14, the turned-over ends of the pole-pieces lying between the two rings.

Fitting over the copper rings is a flat outer ring 15 of magnetic material formed with three radially inwardly projecting pole-pieces 16, and a flat inner ring 17 of magnetic pole-pieces formed with three radially outwardly projecting pole-pieces 18.

These four layers are secured together to form a unit by three circumferentially spaced copper rivets 19 passing through the inner ring portions of magnetic material and copper and the insulating ring, and by three circumferentially spaced copper rivets 20 passing through the outer ring portions of magnetic material and copper and the insulating ring.

The inner turned-over magnetic pole-pieces finish flush with the outer face of the inner flat ring of magnetic pole-pieces and fit into cutaway recesses or rebates 21 formed in the leading edges of the pole-pieces of the inner flat ring of magnetic material.

The outer turned-over magnetic pole-pieces project beyond the outer face of the outer flat ring of magnetic pole-pieces and fit into recesses or rebates 22 formed in the leading edges of the pole-pieces of the outer flat ring of magnetic material.

Thus a clear annular space is left between the outer and inner sets of six pole-pieces.

Into this space there fits a cylindrical shell-shaped rotor 23 of magnetic material such as tungsten or cobalt steel. The shell of the rotor is closed on the outside by a flat aluminum disc 24 through the centre of which passes an axial rod 25 to the outside end of which is secured a small pinion 26.

The inside part of the rod fits into the aperture of the self-lubricating bushing 6 of the inner cylindrical projection 5 in the cup of magnetic material, and the inner end of the rod comes to bear adjacent some form of bearing at the end of the bushing, to locate the cylindrical shell of the rotor in its correct position between the pole-pieces but clear of the insulating ring.

Over the rotor and pole-piece unit there fits a spacing member 27 in the form of a shallow brass cup, open end towards the pole-piece unit, with an axial hole through which the pinion in the rotor projects.

Next comes a disc 28 of absorbent paper followed by a gear unit 29 between two disc-shaped plates 30, the inner one of which closes the cup of magnetic material and the outer one of which is covered with a disc of absorbent paper 31, cut away (as is the inner paper disc) around the bearings of the gear unit, and also cut away to allow an off-centre driving pinion 32 from the gear unit to project outwards.

A further cup 33 of magnetic or non-magnetic material fits over the hole and has an aperture 34 in its base to allow the driving pin 32 to project and to prevent rotation of the gear unit as a whole. The edge of this cup may be spun over to secure it in the first cup.

An oiling aperture 34 is provided in the further cup to oil the gear unit. The discs of absorbent paper serving to hold the oil in the bearings and the inner disc of absorbent paper also serving to help to hold the stator unit from the oil.

Various modifications can be made within the scope of the invention.

Thus, other methods of closing the cup forming the casing may be used, such as an end cup fitted in and soldered all around.

I claim:

1. In a self-starting synchronous motor of the kind in which a set of spaced cooperating pole-pieces of the stator, magnetically linked with the magnet of the stator structures to give their respective polarities, are located respectively radially inside and outside of a cylindrical shell rotor, each pole-piece having a shaded and an unshaded portion, the improvement which consists of the shaded portion of such a pole-piece being located on the radially opposite side of the annular rotor to that on which the unshaded portion of the same pole-piece is located.

2. In a self-starting synchronous motor, of the kind in which a set of spaced co-operating pole-pieces of the stator, magnetically linked with the magnet of the stator structure to give their respective polarities, are located respectively radially inside and outside of a cylindrical shell rotor, a pole-piece structure of the stator comprising an outer flat ring of magnetic material with circumferentially spaced radially inwardly directed pole-pieces projecting from the ring and turned over at their ends into the axial direction to form a ring of turned-over pole-piece ends radially inward of the rotor, and a coplanar inner flat ring of magnetic material with circumferentially spaced radially outwardly directed pole-pieces projecting from the ring and interspaced in relation to the inwardly directed pole-pieces and turned over at their ends into the axial direction to form a ring of turned-over, pole-piece ends radially outward of the rotor.

3. A pole-piece structure as claimed in claim 2 in which a flat insulating ring fits over the turned-over ends of the pole-pieces and is slotted to allow passage of these turned-over ends.

4. In a self-starting synchronous motor, of the kind in which the pole-pieces of the stator are magnetically linked with the magnet of the stator structure to give their respective polarities, a pole-piece structure of the stator comprising a flat radially outer ring of magnetic material with circumferentially spaced pole-pieces projecting radially inward therefrom and turned over at their ends into the axial direction to form a radially inner ring of turned-over pole-piece ends, a coplanar radially inner flat ring of magnetic material with circumferentially spaced pole-pieces projecting radially outwardly therefrom, interspaced in relation to the inwardly directed pole-pieces and turned over at their ends into the axial direction to form a radially outer ring of turned-over pole-piece ends, a flat radially outer ring of copper, a flat radially inner ring of copper, the turned-over ends of the pole-pieces lying between the two copper rings, a second flat outer ring of magnetic material over the outer copper ring and formed with circumferentially spaced pole-pieces projecting radially inwardly therefrom and a second flat inner ring of magnetic material over the inner copper ring and formed with circumferentially spaced pole-pieces projecting radially outwardly therefrom.

5. A pole-piece structure as claimed in claim 4 in which the respective turned-over pole-piece ends of the flat outer ring fit into recesses or rebates in the respective pole-pieces of the second flat inner ring and the respective turned-over pole-piece ends of the flat inner ring fit into recesses or rebates in the respective pole-pieces of the second flat outer ring.

6. A self-starting synchronous motor comprising a stator structure including a magnet, a cylindrical shell rotor, a set of circumferentially spaced pole-pieces of the stator, radially outside the rotor, and magnetic circuit members connecting them with one pole of the magnet, a further set of circumferentially spaced pole-pieces of the stator, radially inside the rotor, and magnetic circuit members connecting them with the other pole of the magnet, a set of circumferentially spaced shaded pole-pieces of the stator radially inside of the rotor and magnetic circuit members connecting them with one pole of the magnet, a further set of circumferentially spaced shaded pole-pieces of the stator radially outside the rotor and magnetic circuit members connecting them with said other pole of the magnet.

References Cited in the file of this patent

UNITED STATES PATENTS

| Number | Name | Date |
|---|---|---|
| 2,455,134 | Mungall | Nov. 30, 1948 |
| 2,531,518 | Kuhlmann | Nov. 28, 1950 |
| 2,537,093 | Schlenker et al. | Jan. 9, 1951 |
| 2,572,632 | Kurz | Oct. 23, 1951 |
| 2,583,180 | Kronmiller et al. | Jan. 22, 1952 |